United States Patent [19]

Toelle

[11] 4,173,205
[45] Nov. 6, 1979

[54] CLOSED LOOP EXHAUST GAS RECIRCULATION SYSTEM

[75] Inventor: Alvin D. Toelle, Fenton, Mich.

[73] Assignee: The Bendix Corporation, Southfield, Mich.

[21] Appl. No.: 855,493

[22] Filed: Nov. 28, 1977

[51] Int. Cl.² .................................. F02M 25/06
[52] U.S. Cl. .................................... 123/119 A
[58] Field of Search ........................ 123/119 A

[56] References Cited

U.S. PATENT DOCUMENTS

| | | | |
|---|---|---|---|
| 3,800,764 | 4/1974 | Goto et al. | 123/119 A |
| 3,915,133 | 10/1975 | Nohira | 123/119 A |
| 3,915,134 | 10/1975 | Young | 123/119 A |
| 3,963,011 | 6/1976 | Saito | 123/119 A |
| 3,982,395 | 9/1976 | Hasegawa | 123/119 A |
| 4,018,198 | 4/1977 | Williams | 123/119 A |
| 4,026,256 | 5/1977 | Fenn | 123/119 EC X |
| 4,060,065 | 11/1977 | Hata et al. | 123/119 A |
| 4,071,003 | 1/1978 | Aono | 123/119 A |

*Primary Examiner*—Wendell E. Burns
*Attorney, Agent, or Firm*—Gaylord P. Haas, Jr.; Russel C. Wells

[57] ABSTRACT

A closed loop exhaust gas recirculation system for an internal combustion engine having an intake system, an exhaust manifold, a throttle disposed within the intake system for controlling air flow therein, a conduit coupling the exhaust manifold to the intake system for supplying exhaust gases back to the intake system for controlling the generation and emission of oxides of nitrogen and for improving driveability. The system includes a first memory pre-programmed with a look-up table of optimal values of absolute manifold pressure ($MAP_0$) as a function of engine speed (RPM) and throttle position ($\theta$). The actual operating parameters of absolute manifold pressure (MAP), engine speed (RPM) and throttle position ($\theta$), or alternatively air flow (AF), are accurately sensed. The actual values of throttle position or air flow and RPM are used to address the first memory which outputs the pre-programmed optimal value of MAP. The actual value of throttle angle or air flow may be compensated for ambient barometric pressure and/or altitude, if desired. The actual value of MAP is compared with the optimal value of $MAP_0$. The output of the comparator is used to close the loop and control the position of a valve positioned at least partially within the conduit such that the amount of recirculated exhaust gas (EGR) supplied to the input system is increased if $MAP < MAP_0$ and the amount of EGR is decreased if $MAP > MAP_0$.

11 Claims, 6 Drawing Figures

CLOSED LOOP EXHAUST GAS RECIRCULATION SYSTEM

BACKGROUND OF THE INVENTION

1. Field of Invention

This invention relates generally to exhaust gas recirculation (EGR) systems for controlling emissions in vehicles and more particularly to a closed loop exhaust gas recirculation system which senses the actual operating parameters of absolute manifold pressure (MAP), engine speed (RPM), and throttle position ($\theta$), or air flow (AF), and accurately controls EGR using a comparison of uncompensated, or preferably pressure compensated, values of actual absolute manifold pressure MAP with preprogramed optimal values of absolute pressure $MAP_0$ stored in a look-up memory table.

2. Statement of the Prior Art

It is generally recognized that the production of noxious oxides of nitrogen ($NO_x$) which pollute the atmosphere are undesirable and in many cases are controlled by limits established by local, state and federal governmental regulations. The formation of $NO_x$ constituents in the exhaust gas products of an internal combustion engine must therefore be eliminated, minimized or at least maintained below some predetermined limit.

It is generally understood that the presence of $NO_x$ in the exhaust of internal combustion engines is determined by combustion temperature and pressure. An increase in combustion temperature causes an increase in the amount of $NO_x$ present in the engine exhaust. It is, therefore, desirable to control the combustion temperature in order to limit the amount of $NO_x$ present in the exhaust of an internal combustion engine.

One method suggested by the prior art for limiting or controlling the combustion temperature has been to recirculate a portion of the exhaust gas back to the engine air intake. Since the exhaust gas is low in oxygen, this will result in a richer combustion mixture which will burn at a lower temperature. The lower combustion temperature will, in turn, reduce the amounts of $NO_x$ produced during combustion.

Similarly, it has, until recently, been common practice to run an internal combustion engine at or near a spark timing which produces maximum peak combustion pressures. Unfortunately, however, at or near peak combustion pressures, unacceptably high levels of $NO_x$ are produced in the combustion chambers when the engine operates at or near spark timings which produce maximum peak combustion pressures. In order to inhibit the formation and emission of $NO_x$ it is therefore desirable to limit the peak combustion pressure to a selected value.

One technique suggested by the prior art for limiting combustion pressure involves the recirculation of exhaust gases through the induction passage of the combustion chamber since it is well-known that an increase in recirculation of exhaust gases will reduce peak combustion pressure and thus the attendant levels of undesirable $NO_x$. Similar results may be achieved by retarding the spark.

Therefore, it is generally well-known that the formation of undesirable oxides of nitrogen may be reduced by recirculating a portion of the exhaust gas back to the engine air/fuel intake passage so as to dilute the incoming air/fuel mixture with inert $N_2$, $H_2O$, and $CO_2$. The molar specific heat of these gases and especially of $CO_2$ absorbs substantial thermal energy so as to lower peak cycle temperatures and/or pressures to levels conducive to reducing $NO_x$ formation.

While $NO_x$ formation is known to decrease as the exhaust gas recirculation (EGR) flow increases to where it represents about twenty percent of the exhaust gas constituents, it is also known that this is accompanied by a deterioration in engine performance including, but not limited to an increase in the engine roughness with increasing EGR. Therefore, one factor limiting the magnitude of EGR is the magnitude of EGR-induced performance deterioration or roughness that can be tolerated before vehicle drivability becomes unacceptable.

Most of the prior art attempts at solving these problems have employed various mechanical schemes for directly controlling the position of the EGR control valve which may be operated by sensing a single parameter such as throttle position, intake manifold pressure, exhaust back pressure, the air/fuel ratio, etc.

Such prior attempts to control EGR by sensing and shaping signals indicative of a single parameter of engine performance or sensing engine flow as a function of venturi vacuum or exhaust back pressure are not conducive to accuracy or programability.

Closed loop control systems for controlling various parameters of an internal combustion engine are known in the art, as are the above-identified EGR control systems, even though the prior art does not include many EGR control systems employing a closed loop mode of operation. U.S. Pat. No. 3,872,846 issued to L. B. Taplin et al on Mar. 25, 1975 for an Exhaust Gas Recirculation (EGR) Internal Combustion Engine Roughness Control System and is assigned to the assignee of the present invention. This patent teaches a closed loop internal combustion engine control system provided for controlling the exhaust gas recirculation flow so as to regulate engine roughness at a predetermined level. The closed loop control system of this patent receives input signals indicative of the engine roughness and generates therefrom an EGR valve command signal for varying the position of an EGR valve so as to effect the maximum possible EGR flow compatible with a predetermined maximum level of permissible engine roughness.

It is desirable to be able to control the generation and emission of noxious oxides of nitrogen during all modes of engine operation without causing vehicle drivability to reach an unacceptable level. It is also desirable to be able to accurately and programatically control $NO_x$ formation in a manner so as to allow a trade off between vehicle drivability and $NO_x$ formation, to suit the requirements of a given application.

It is, therefore, an object of the present invention to provide a new and improved closed loop control system for reducing the formation of certain exhaust constituents of an internal combustion engine.

It is another object of the present invention to provide a closed loop control system for preventing deterioration of engine performance below a predetermined level, for regulating engine roughness, and the like.

It is another object of the present invention to provide a method and apparatus employing a closed loop egr control system which will provide improved accuracy over the entire range of engine operating conditions, greater programability of the amount of EGR for various conditions of speed and load, and improved control during transient modes of operation while simultaneously allowing a tighter control of $NO_x$ emissions.

It is yet another object of the present invention to provide an economical, highly reliable, programable method and apparatus for accurately maintaining a predetermined balance between $NO_x$ formation and vehicle drivability.

These and other objects and advantages of the present invention will be accomplished by the method and apparatus for the closed-loop control of EGR utilizing manifold pressure, engine speed, and either throttle position or air flow. For greater accuracy, compensation for variations in altitude and/or ambient barometric pressure are also provided.

SUMMARY OF THE INVENTION

The closed loop exhaust gas recirculation system of the present invention is employed in an internal combustion engine having an intake system, throttle means for controlling the flow of air into the intake system and some type of output shaft rotatably driven by the combustion of fuel and air within the engine. The closed loop EGR control system of the present invention includes a memory means for storing a look-up table of optimal values of absolute manifold pressure ($MAP_0$) as a function of engine speed (RPM) and either throttle angle ($\theta$) or air flow (AF). A unique one of the stored optimal values of $MAP_0$ is defined for each memory location and each memory location is accessible by addressing first and second memory dimensions. Means responsive to the rotation of the output shaft are provided for generating a first digital number indicative of the actual engine speed for addressing one of said first and second memory dimensions. Another means associated with the throttle means is provided and is responsive to the relative position thereof for generating a second digital number indicative of the actual throttle position $\theta$ for addressing the other of said first and second memory dimensions. The memory is responsive to its first and second memory dimensions being addressed by said first and second digital numbers for accessing a unique memory location defined thereby to output a third digital number indicative of a unique optimal value of $MAP_0$ stored therein.

Means coupled to the intake system and responsive to the actual absolute manifold pressure MAP existing therein are provided for generating a fourth digital number indicative of the actual absolute manifold pressure MAP. Means are provided for comparing the third and fourth digital numbers and for generating a first control signal if $MAP < MAP_0$ and for generating a second signal if $MAP > MAP_0$.

A conduit operably connects the exhaust supply to the intake supply for supplying exhaust gases back to the intake system for inhibiting the generation and emission of $NO_x$ while regulating drivability and the like. A valve means is disposed at least partially within the conduit for regulating the flow of exhaust gases back to the intake system. Valve control means are provided responsive to said first control signal for increasing the amount of EGR supplied to the intake system and responsive to said second control signal for decreasing the amount of EGR supplied to the intake system thereby conpleting a closed loop method of control capable of being accurately programed for any desired set of operating conditions. The preferred embodiment of the present invention also contemplates means for compensating either the third or fourth digital number for variations in ambient barometric pressure and/or altitude for even greater accuracy and reliability under all operating conditions.

Furthermore, the invention contemplates a method of closed loop control of EGR including the steps of pre-programming a memory with a look-up table of optimal values of manifold absolute pressure as a function of engine speed and throttle position; addressing the look-up table of the memory with the actual values of engine speed and throttle angle measured as operating conditions of the engine; and then reading out the unique optimal value of absolute manifold pressure stored in the address memory location of the look-up table of the memory. The optimal value of manifold absolute pressure read out of the memory is then compared with the actual value of manifold absolute pressure measured as one of the operating conditions of the engine and the exhaust gas recirculation valve is operated in response to the result of the comparison for decreasing the quantity of exhaust gas fed back to the intake manifold whenever the comparison indicates that the actual absolute manifold pressure is greater than the pre-programmed optimal absolute manifold pressure and for increasing the amount of exhaust gas fed back to said intake manifold whenever the actual manifold absolute pressure is less than the preprogrammed optimal manifold absolute pressure.

The method and apparatus contemplated by the present invention provides a means for operating an EGR system closed loop based on the sensed engine parameters of engine speed, manifold pressure, and either throttle position or air flow and provides a means of calibrating any EGR quantity merely by changing the optimal values of $MAP_0$ stored in a memory look-up table.

Other advantages and meritorious features of the present invention will be more fully understood from the following detailed description of the drawings and the preferred embodiment, the appended claims and the drawings, which are described briefly hereinbelow.

DESCRIPTION OF THE PREFERRED EMBODIMENT

Figure 1:
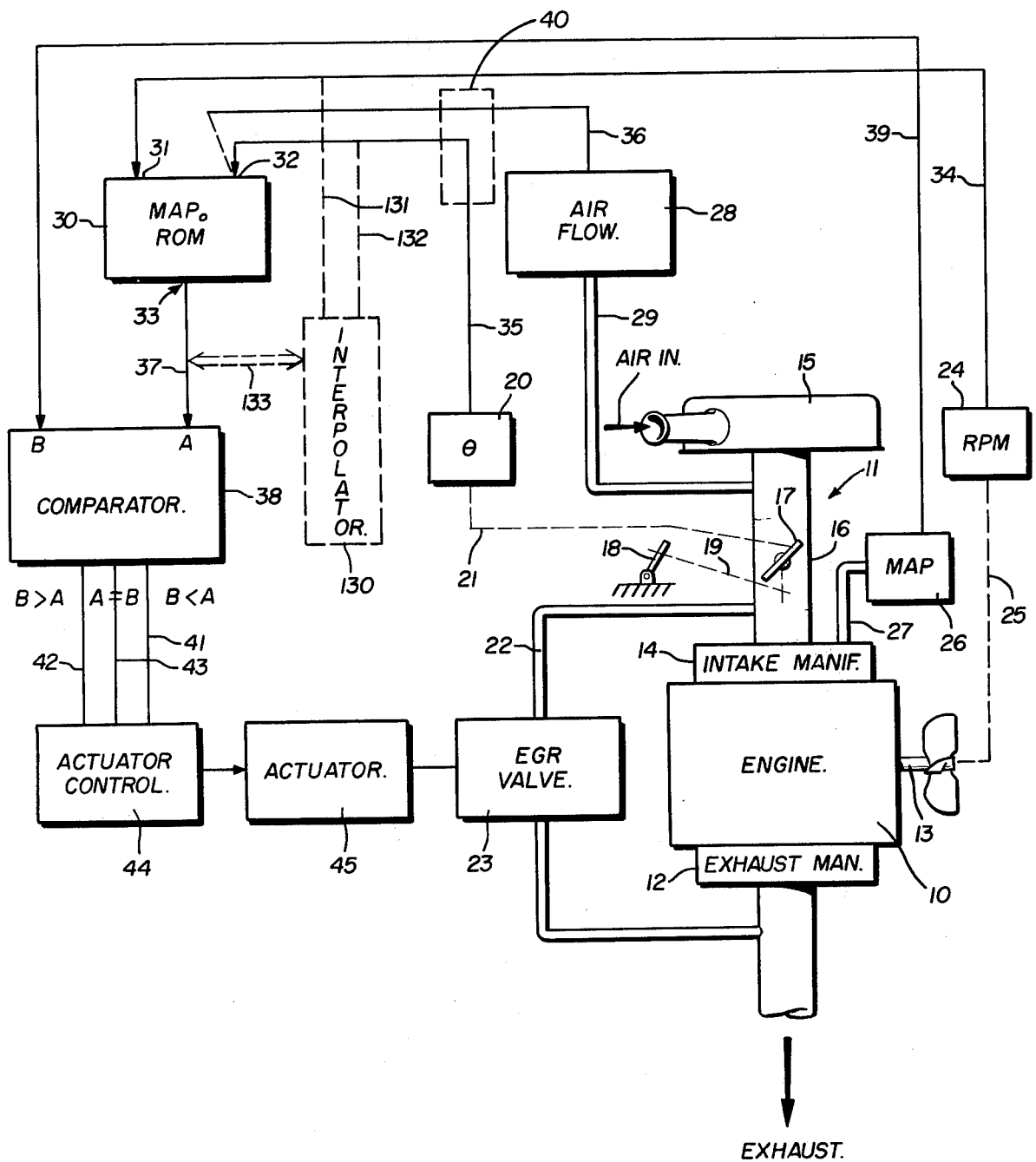
FIG. 1 is a block diagram illustrating the closed loop exhaust gas recirculation system of the present invention.

The concept of the present invention is at least partially based upon the fact that the absolute manifold pressure (MAP) represents the total pressure of gases in the intake manifold of an internal combustion engine. The total pressure is made up of various partial pressures including (a) external EGR, commonly referred to simply as EGR, (b) internal EGR due to valve overlap, (c) by-pass air attributable to fast idle conditions, (d) throttle air which is a function of throttle angle and density, and (e) gas resulting from internal and external leakage. Since internal EGR due to valve overlap, by-pass air, and leakage remain fixed for all practical purposes, EGR becomes a function of manifold pressure, throttle angle and air density. Assuming a correlation for air density (altitude and/or ambient barometric pressure), changes in EGR are directly proportional to changes in MAP at any given throttle angle or air flow and engine speed (RPM). If the system is sensing mass air flow, there will be no compensation for altitude. If volume flow is sensed, the compensation would be for density and ambient temperature.

Since we can define all engine operating parameters as a function of MAP and RPM, we can define optimal values of absolute manifold pressure $MAP_0$ as a function of either RPM and throttle angle or as a function of RPM and air flow. A comparison of actual values of MAP with the optimal value of $MAP_0$ determined by looking them up in a table in accordance with the actual measured values of RPM and either air flow or throttle angle, indicates that any difference will be the result of too much or too little EGR having been added.

Therefore, the present invention involves pre-programming a memory look-up table with optimal values of what the absolute manifold pressure $MAP_0$ is desired to be for given values of RPM and either throttle angle or air flow.

It will be understood that there is no one set of ideal optimal values of absolute manifold pressure but a look-up table of optimal values of absolute manifold pressure may be generated as a function of engine speed and either throttle angle or air flow for a given set of predetermined operating characteristics, such as a specified maximum limit to the generation and emission of $NO_x$ and a minimum level of deterioration in vehicle drivability for a given engine in a given vehicle for use under given conditions, etc. The techniques for experimentally and/or mathematically determining a set of optimal values for particular engine operating parameters as a function of two other engine operating parameters is well-known in the art.

The desired relationships between the controlled variables and the sensed conditions are determined generally, by experimental methods. At every instant in the operation of an internal combustion engine, and over its entire range of operation, there exist optimal settings for the controlled variables. The definition of what is optimal is not fixed but rather depends upon the use to which the engine is put and its state of operation that particular instant. For example, where the engine and its control system are to be employed in a passenger car, the overall goal for the engine control system may be maximizing efficiency, fuel economy and drivability while at the same time minimizing the emission of noxious pollutants. Also, for a passenger car engine control system, optimal settings for the controlled variables are different, for example, when it is deaccelerating than when it is operating at a steady speed or accelerating. To complicate matters further, the controlled variables are interdependent and this interdependence of the controlled variables must be taken into consideration when preparing a given table of optimal values of $MAP_0$ for a given range of engine speeds and either throttle position or air flow.

To experimentally determine the optimal values to be stored in the look-up tables of the ROM 30, a series of well-known and commonly used tests may be performed on a given engine type to determine the optimal desired relationships between $MAP_0$ and the sensed conditions. Such tests and measurements are discussed in U.S. Pat. No. 3,969,614 which is incorporated by reference herein and once an optimal set of values has been determined, the ROM 30 may be pre-programed accordingly. If a new set of circumstances should exist, the ROM will be reprogramed to provide a new set of optimal values, as desired.

FIG. 1 shows an internal combustion engine 10 having an intake system 11, an exhaust manifold 12, and an output shaft 13 which is operatively rotated by the combustion of fuel and air within the engine 10, as conventionally known.

The intake system 11 includes an intake manifold 14, an air inlet apparatus 15 and a throat 16 communicating the air inlet 15 with the intake manifold 14. A throttle valve 17 such as a conventional butterfly valve or the like is operatively disposed within the throat 16 to control the air flow between the inlet 15 and the intake manifold 14 for varying the air/fuel ratio and the like as conventionally known. An accelerator pedal 18 is conventionally used to vary the position of the throttle valve 17 as indicated by the dotted line 19 from the accelerator pedal 18 to the throttle valve 17.

Transducer means generally included within the block 20 is operatively coupled to or associated with the throttle valve 17 as indicated by the dotted line 21 for sensing or measuring the throttle angle or throttle position $\theta$.

A conduit 22 is provided for connecting the exhaust manifold 12 to the intake system 11 for supplying exhaust gases back to the intake system for reducing the generation and emission of $NO_x$ and/or improving or at least preventing deterioration of vehicle drivability. An exhaust gas recirculation (EGR) valve generally represented by block 23 is disposed in or partially within or operatively associated with the conduit 22 for regulating, controlling or metering the EGR flow.

Block 24 includes means such as a reluctance transducer for sensing timing marks located on a rotating member of the engine such as the output shaft 13, as represented by the dotted line 25, and circuitry for measuring the time interval between fixed timing marks and generating a digital number representative or indicative of the actual operating speed or RPM of the engine 10.

Block 26 is operatively coupled to the intake system 11 via conduit 27 and includes pressure transducer means for sensing absolute manifold pressure and converting the analog signal representative thereof to a digital number representative or indicative of the actual absolute manifold pressure MAP of the engine 10.

Block 28 represents air flow sensing circuitry which may optionally be used instead of the circuitry of block 20. Block 28 would include transducer means operatively coupled via connection 29 to the intake system 11 for sensing the air flow therein and circuitry for converting the sensed air flow into a digital number representative of or indicative of the actual air flow in the intake system 11.

The closed loop EGR system of FIG. 1 includes a memory 30 such as a conventional read only memory ROM containing a look-up table of preprogramed or predetermined digital numbers having any desired number of bit positions, each representing an optimal value of absolute manifold pressure as a function of and for a given set of engine speeds and either throttle positions or air flow values. Any suitable conventional ROM may be used which can be selectively programmed with the desired set of optimal values and any desired size of ROM, i.e., number of addressable memory locations may be used. Typically, the ROM 30 includes a first memory input 31 adapted to receive a first digital number for addressing a first memory dimension, for example, a given X-coordinate or row of the stored look-up table and a second memory input 32 adapted to receive a second digital number for addressing a second memory dimension such as the Y-coordinate or column address of the stored look-up table of optimal values. Typically, the ROM 30 further includes a memory output 33 for outputting the accessed or addressed digital number representing the optimal value $MAP_0$ stored in the address location defined by the first and second digital numbers presented at the first and second inputs 31, 32.

In the closed loop EGR control system of FIG. 1, the multi-bit digital number from the RPM circuitry of block 24 is supplied via data path 34 to the first memory input 31 of the ROM 30 so that the digital number representing RPM may be used to address the first dimension or row address of the look-up table of optimal $MAP_0$ values stored in the ROM 30. Similarly, the multi-bit digital number representing the throttle angle which is outputted from the circuitry of block 20 may be supplied via data path 35 to the second input 32 of ROM 30 for addressing the second dimension or column address of the look-up table stored therein.

Alternatively, the multi-bit digital number representing the actual value of air flow which is outputted from the circuitry of block 28 may be supplied via data path 36 to the second input 32 of ROM 30 instead of the throttle angle information on data path 35 for addressing the second memory dimension or column address of the look-up table stored within the ROM 30. Once the digital number representing that the actual engine speed RPM is present at the first input 31 of the ROM 30 and the digital number representing the actual throttle angle or the actual air flow is present at the second input 32 of the ROM 30, a unique memory location is addressed and the multi-bit digital number stored therein, which represents a pre-programmed optimal value of $MAP_0$, is supplied from the ROM output 33 to one input of a digital comparator 38 via data path 37. Alternatively, the multi-bit digital number representing the value of the throttle angle or air flow may be coupled via data path 39 to the compensation logic represented by the dotted block 40 of FIG. 1 for compensating the actual value for variations in altitude and/or ambient barometric pressure or the like.

The multi-bit digital number indicative of the actual absolute manifold pressure MAP is supplied from MAP sensor, which may take the form of an oscillating crystal MAP sensor such as described in a patent to J. P. Corbett, U.S. Pat. No. 4,020,448, issued Apr. 26, 1977, via data path 39 to the second input of the digital comparator 38.

If cost, space, accuracy or similar practical considerations dictate, the size or memory capacity of the ROM 30 (and even the ROM 95) may be insufficient to store all possible values of optimal absolute manifold pressure $MAP_0$ (or compensation factors K) needed for the range of possible RPM and either throttle position or air flow values (or MAP and pressure/altitude values) required for a particular application. Then any conventional interpolation network 130 may be provided for interpolating between stored values, as known in the art. The interpolation network could be supplied with the RPM address information via dotted path 131, with the throttle position address (or air flow) via dotted path 132 and with the stored memory value via data path 133. The network 130 would modify the stored value in accordance with conventional interpolation techniques to supply a more accurate modified optimal value $MAP_0$ to the "A" input of comparator 38 via paths 133 and 37.

For example, the linear interpolation circuitry disclosed in copending application Ser. No. 837,657, filed on Sept. 29, 1977 for an Exhaust Gas Recirculation Controller could be used. This application is assigned to the assignee of the present invention and is incorporated by reference herein. In the copending application, the most significant bits of the actual value numbers are used to address the ROM and the less significant bits are used to perform a linear interpolation to yield an accurately modified memory output.

Similarly, a two dimensional interpolation of the fixed word value could be used as disclosed in U.S. Pat. No. 3,862,404, which is incorporated by reference herein. Any conventional interpolation mean can be used, if required, of any one type of interpolation means. It should be recognized, however, that such interpolation means may not even be required for many applications of the closed loop EGR control system of the present invention.

Comparator 38 is a conventional digital comparator having a first input "A" and a second input "B" each of which is adapted to receive a multibit digital number. The comparator 38 will output a first control signal on lead 41 if the digital number present at the second input "B" is less than the magnitude or value of the digital number present at the first input "A". The comparator 38 will output a second control signal via lead 42 if the digital number present at the second input "B" is greater than the value or magnitude of the digital number present at the first input "A". Furthermore, the comparator 38 will output a third signal via lead 43 whenever the digital numbers present at the inputs "A" and "B" are equal.

The actuator control logic of block 44 is responsive to the receipt of the first, second and third control signals outputted from the comparator 38 for controlling the operation of the actuator means of block 45. The actuator means of block 45 is then used to close the control loop and may operate the EGR valve 23 as by opening or closing the valve so as to increase the amount of EGR supplied to the intake system 11 whenever $MAP < MAP_0$ and for decreasing the amount of EGR supplied to the intake system 11 whenever $MAP > MAP_0$.

The specific circuitry of each of the individual blocks of FIG. 1 is not critical to an understanding of the present invention and any conventional circuitry which would be obvious to those skilled in the art for performing the stated function may be used although specific examples are given in the description of FIGS. 2-6 which are hereinafter described.

Figure 2:
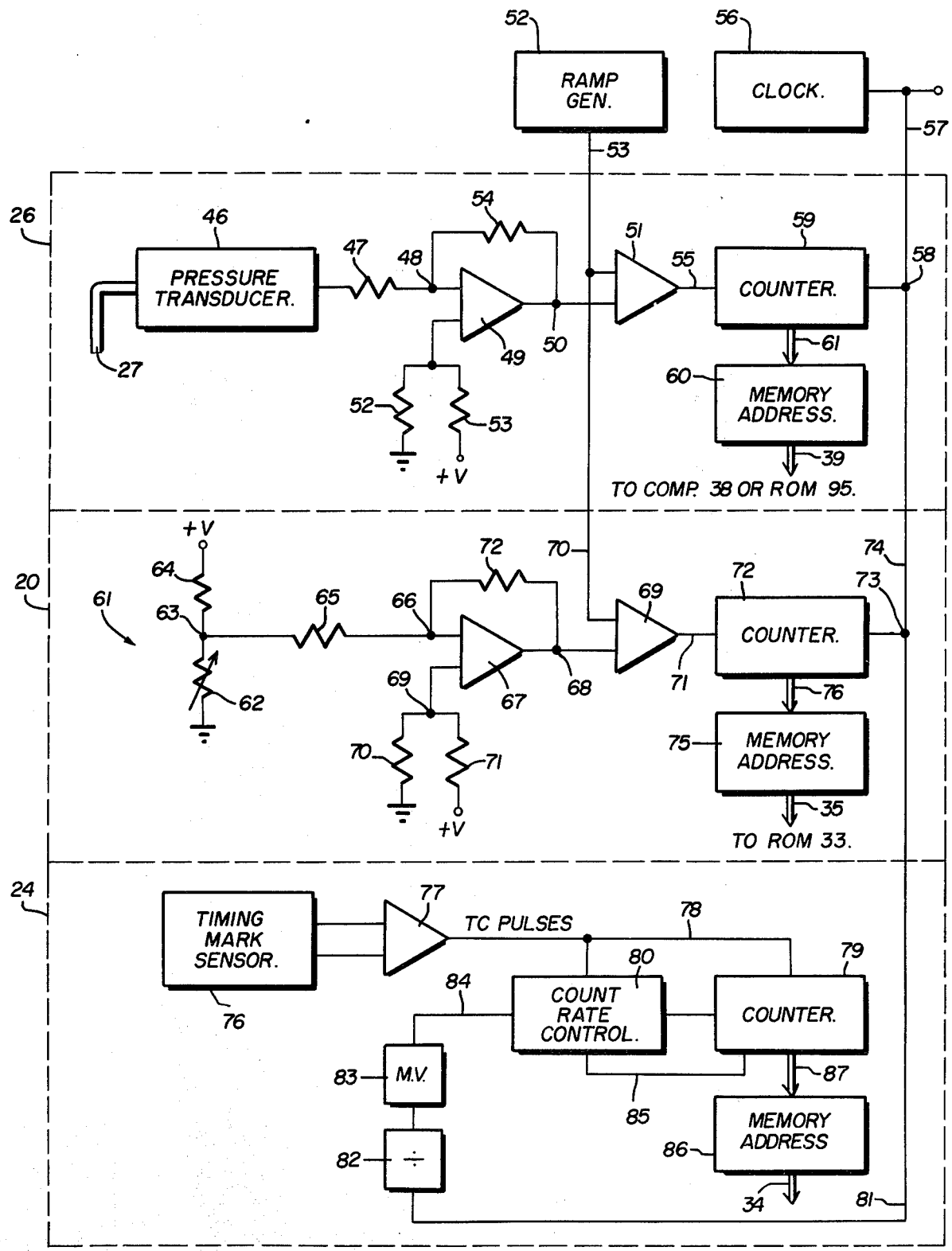
FIG. 2 is a partially schematic partially block diagram of circuitry for implementing the sensing, A/D conversion (where required) and memory addressing functions represented by the blocks labeled "RPM", "MAP", and "$\theta$" of the system of FIG. 1.

FIG. 2 illustrates one embodiment of the sensing means, A/D conversion means, and memory address means contained within the MAP block 26, the throttle position block 20 and the RPM block 24 of FIG. 1. Any suitable sensing means, A/D converting means (if reqiired) and memory addressing means capable of accurately measuring the designated engine operating parameters and addressing the ROM 30 and/or comparator 38 could also be used.

In FIG. 2, the sensing means, A/D converting means and memory address means represented by the MAP block 26 of FIG. 1 will be further described as follows. A conventional pressure transducer 46 such as a standard strain-gage diaphram-type absolute pressure transducer or a Gulton pressure transducer is operatively coupled to the intake manifold 14 of the intake system 11 of FIG. 1 via a vacuum hose or coupling 27. The output of the pressure transducer 46 is a voltage signal proportional to the actual absolute manifold pressure. This signal is supplied via lead 47 to an amplifier input node 48. Node 48 is connected directly to one input of an operational amplifier 49 whose output is taken from amplifier output node 50. A second input of the first operational amplifier 49 is connected directly to a node 51 and node 51 is connected to ground through a resistor 52 and is connected to a source of positive potential through a resistor 53. A resistor 54 is connected across the operational amplifier 49 between the input node 48 and the output node 50 to form a conventional operational amplifier configuration.

The output of the operational amplifier 49 is supplied from output node 50 directly to a first input of a voltage comparator 51. The resistance values associated with the operational amplifier 49 condition the output of the transducer 46 so that the output voltages corresponding to the minimum and maximum expected absolute manifold pressures are the same as the minimum and maximum voltages generated by a conventional ramp generator 52. The output of the ramp generator 52 is connected via lead 53 and node 54 to the second input of the comparator 51 so that the comparator 51 provides a high signal at its output lead 55 as long as the output of the operational amplifier 49 is greater than the output voltage of the ramp generator 52.

A clock 56 is connected via clock output lead 57 to an input node 58 of a binary counter 59. The output lead 55 of the comparator 51 is also connected to an input of the counter 59 so as to enable the counter 59 to count the clock pulses outputted by clock 56 and supplied to the counter 59 via clock input node 58. The number of counts accumulated in the counter 59 when the output 55 of the comparator 51 goes low, is determined by the pulse width of the signal outputted from the comparator 51 which is a function of the magnitude of the voltage outputted from the pressure transducer 46. The counter 59 is a conventional binary counter capable of transferring the count stored therein in parallel to a memory address register or buffer 60 via data path 61 as soon as the count terminates when the output 55 of the comparator 51 goes low. The parallel outputs represented by the data path 39 from the memory address register 60 are supplied to the "B" input of the comparator 38 of FIG. 1.

The transducer means, A/D converter means, and memory addressing means of block 20 of FIG. 1 will now be described with reference to FIG. 2. A conventional position transducer 61, such as a conventional one-turn wire-wound potentiometer electrically connected in a voltage divider circuit for supplying DC voltages proportional to the relative position of the throttle valve 17 is shown as including a variable resistor 62 having one end grounded and the other end connected to a voltage divider node 63. Node 63 is connected through a resistor 64 to a source of positive potential. Resistance changes caused by variations in the position or angle of the throttle valve 17, are sensed by measuring the voltage drop across the variable resistor 62. The output of the transducer 61 is taken from node 63 and supplied via resistor 65 to an input node 66 of a second operational amplifier 67. The output of the operational amplifier 67 is taken from output node 68 and the second input to the operational amplifier 67 is directly connected to a node 69. Node 69 is connected to ground through a resistor 70 and to a source of positive potential through a resistor 71. A resistor 72 is directly connected across the operational amplifier 67 between the input node 66 and the output node 68 to form a conventional operational amplifier configuration.

As previously described, the configuration of the operational amplifier 67 conditions the output of transducer 61 so that the voltages corresponding to the minimum and maximum expected positions of the throttle valve 17 correspond to the minimum and maximum voltages generated by the ramp generator 52.

As previously described, the output 68 of the operational amplifier 67 is directly connected to one input of a voltage comparator 69 whose other input is connected via lead 70 to input node 54 of comparator 51 for receiving the ramp voltage outputted via lead 53 from ramp generator 52. The comparator 69 provides a high signal at its output on lead 71 as long as the output signal taken from output node 68 of the operational amplifier 67 is greater than the ramp voltage provided to the second input of the comparator 69.

The high signal at the output of comparator 69 is supplied via lead 71 to condition a binary counter 72 to count clock pulses received at a clock input 73 via a lead 74 connected to the clock input 58 of block 56 and to the output of the clock 56 via lead 57. The number of counts accumulated in the binary counter 72 when the output of the comparator 69 goes low is determined by the pulse width out of the comparator 69 which is a function of the magnitude of the voltage outputted from the output node 63 of the transducer 61.

The binary counter 72 is a conventional counter capable of outputting the count stored therein in parallel to a memory address register or buffer 75 via data path 76 as soon as the signal at the output of the comparator 69 goes low disabling the counter 72. The multi-bit digital number stored in the buffer 75 is outputted via data path 35 and supplied to the second input 32 of the ROM 30 for addressing the second memory dimension or column of the look-up table stored therein.

In the alternative, the embodiment illustrated in FIG. 3 may be used to address a first memory dimension or row of a second look-up table storing values of throttle angle ($\theta$) compensating constants K, as described below.

The sensing means, counter and memory address means represented by the RPM block 24 of FIG. 1 will now be described with reference to the corresponding block of FIG. 2. Engine speed or RPM is determined by measuring the time interval between fixed timing marks which are located on a rotating member such as the output shaft 13 of the engine 10 of FIG. 1. The actual means used for sensing the timing marks in indicated by block 76 and may be, for example, a magnetic reluctance pick-up, a photo optical sensor, or any suitable conventional means for counting timing marks. The outputs of the timing mark sensor means of block 76 are connected to the inputs of an amplifier 77 for generating conventional TC pulses indicative of engine RPM. Engine speed information is obtained by measuring the time interval of the number 2/N of an engine revolution where N is the number of cylinders in the internal combustion engine 10.

The TC pulses which occur every 720/N degrees are supplied via lead 78 and used to reset a binary counter 79 which initially advances at a predetermined relatively slow rate of, for example, one count every 64 microseconds of elapsed time as determined by the rate control circuitry of block 80. The output of the clock 56 is supplied via lead 57, node 58, lead 74, node 73, and lead 81 to a conventional frequency divider 82 whose output is used to control a free running multivibrator 83 so as to output the predetermined rate of advancement, such as one count every 64 microseconds of elapsed time, which is supplied lead 84 to the count rate control circuit of block 80.

The initial counting rate begins a predetermined time, such as two milliseconds after the occurrence of the reset, and lasts for a predetermined period such as eight milliseconds. The count rate is decreased to 128 microseconds for the next eight milliseconds and then 256 microseconds for the next 16 milliseconds, etc. This provides a means to measure engine speed with a variable precision to allow an engine speed range of 500 to 7,500 RPM's, for example, being coded as a single eight bit binary word containing the necessary engine period data. Outputs of the counter 79 are supplied via lead 85 back to the count rate control circuit of block 80 to adjust the rate, as previously described, after each predetermined eight millisecond period.

The output of the binary counter 79 is supplied in parallel to a memory address register to buffer 86 via data path 87 and the output of the memory address register 86 is supplied via data path 34 to the first input 31 of ROM 30 for addressing the first dimension or row address of the look-up table of optimal MAP$_O$ values contained in the look-up table stored therein.

Any conventional circuitry, known in the art, for measuring engine RPM and generating a digital number indicative thereof may be substituted for the circuitry of block 24, as desired, provided sufficient accuracy is maintained.

Figure 3:
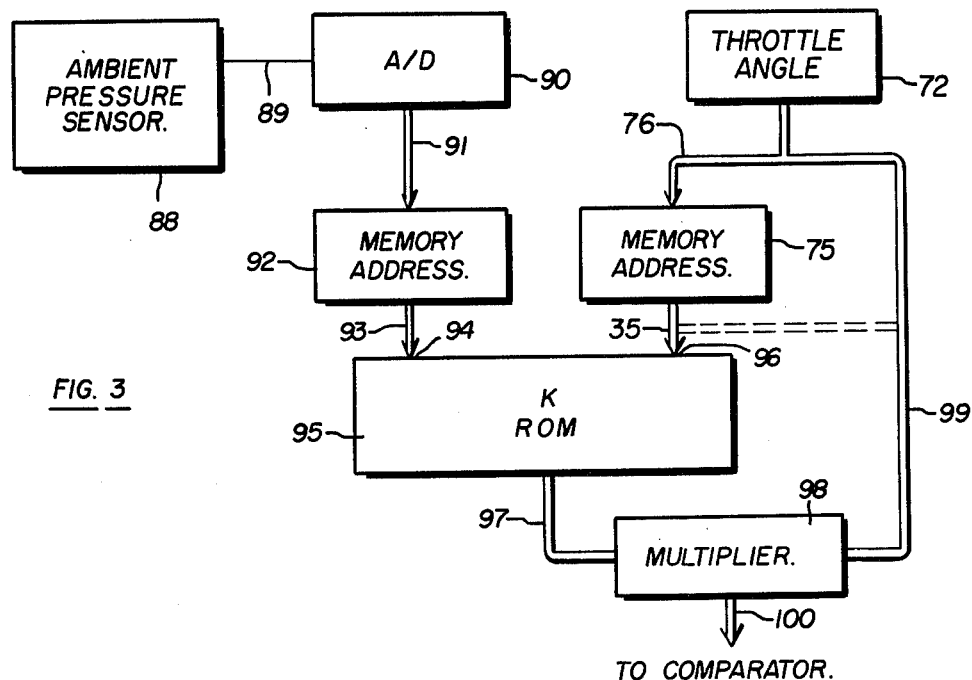
FIG. 3 is a block diagram of the compensation circuitry included in the preferred embodiment of the present invention and represented by the dotted block 40 of the closed loop EGR control system of FIG. 1.

The block diagram of FIG. 3 represents the compensation circuitry of dotted block 40 of FIG. 1 which may be used to compensate either the digital number representing the value of throttle angle or the digital number representing the value of air flow, as desired. The block diagram of FIG. 3 may be used to compensate for variations in ambient barometric pressure, altitude, or the like. Such compensation is necessary since several engine functions can be affected by changes in ambient barometric pressure and altitude. Customarily, the variations have been ignored and/or tolerated with the exception that if an automotive vehicle is normally used at higher altitudes, a permanent change is often made in various operating parameters to allow the engine to operate correctly at a reduced altitude so long as the vehicle is kept at substantially the same altitude. If the vehicle is driven to sea level conditions, then problems will again develop which severely effect the generation and emission of $NO_x$ and/or vehicle drivability.

The block diagram of FIG. 3 provides this compensation. Block 88 represents any conventional means for sensing ambient barometric pressure and/or altitude and generating an analog signal proportional thereto. This analog signal is supplied via lead 89 to the input of a conventional analog to digital A/D converter 90 which outputs, in parallel, a digital number representative of or indicative of the actual ambient barometric pressure or altitude, whichever is being sensed by a sensing means of block 88. Alternatively, a direct digital read-out could also be used. This digital number is supplied via data path 91 to a memory address register or buffer 92 whose output is supplied in parallel, via data path 93 to a first input 94 of a conventional memory means such as a read only memory (ROM) 95. The first input 94 is adapted to receive a multi-bit digital number for addressing a first memory dimension or row of a look-up table stored within the ROM 95.

The ROM 95, is preferably pre-programmed with a set of compensating constants K whose values are represented as multi-bit digital numbers stored in the various memory locations of the ROM 95. The compensation factors K are a function of the actual ambient barometric pressure or altitude and the throttle angle or air flow values which are determined either experimentally or mathematically, as conventionally known, and preprogrammed into the ROM 95 for a given set of operating circumstances, as previously described.

The multi-bit digital number contained within the throttle angle counter 72 of FIG. 2 is transferred via data path 76 and stored in a memory address register or buffer 75 as previously described. The outputs of the buffer registers 75 are connected in parallel, as represented by data path 35 to a second input 96 of the ROM 95. The multi-bit digital number stored in the memory address register 75 and supplied to the second input 96 is adapted to be used to address the second memory dimension or column of the look-up table stored values of compensating constants K, as conventionally known, so that the unique memory location addressed by the first memory dimension designated by the digital number present at the first input 94 and the second memory dimension addressed by the digital present at the second input 96 is accessed. This causes the ROM 95 to output, via data path 97, the multi-bit digital number representing the pre-programmed compensation constant K stored at the uniquely addressed memory location and for supplying the multibit digital number representing the outputted compensation constant K to one input of a conventional multiplier 98. The other input of the multiplier 98 is connected via data path 99 to the parallel outputs of the throttle angle binary counter 72 or the parallel outputs 35 of the memory address register 75. Therefore, the multi-bit digital number representing the value of throttle angle is multiplied by the pre-programmed compensation constant K to output a compensated value of throttle angle via parallel data paths 100 for input 32 of the ROM 30 of FIG. 1.

Figure 4:
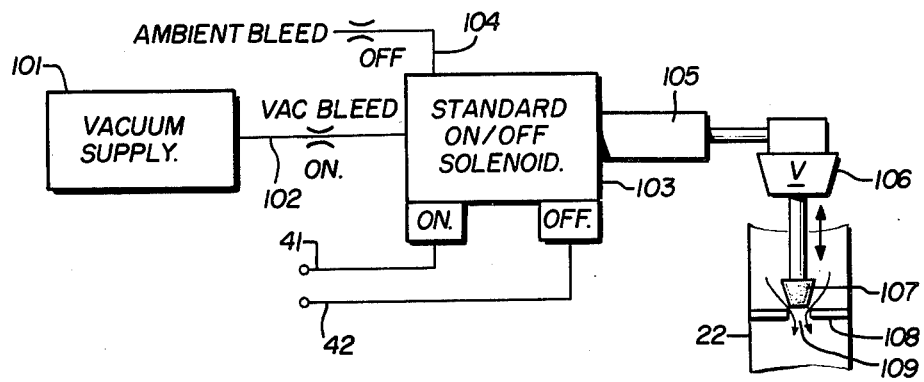
FIG. 4 is a block diagram illustrating one embodiment of the actuator control, actuator and EGR valve of the system of FIG. 1.

FIG. 4 represents one embodiment of the control actuator of block 44, the actuator of block 45, and the EGR valve of block 23 of FIG. 1. In FIG. 4, a vacuum supply 101, such as is conventionally provided in motor vehicles, is connected via conduit 102 to the input of a standard on/off solenoid 103, all of which represents the actuator control circuitry of block 44 of FIG. 1. The conduit 102 includes a solenoid-operated vacuum bleed valve which bleeds vacuum into the system when the solenoid is "on". A conduit 104 exits the solenoid 103 and includes an ambient bleed valve operable when the solenoid 103 is "off" so as to provide a controlled on/off solenoid with calibrated bleeds. The solenoid 103 is turned on via the first control signal outputted from the comparator 38 via lead 41 and is turned off in response to the second control signals supplied via lead 42 from the outputs of the comparator 38 of FIG. 1. When the signals are equal, the comparator output on lead 43 will not effect the operation of the solenoid 103.

The actuator of block 45, corresponds generally to the solenoid-positioning member 105 which raises or lowers the standard EGR valve 106 so that the valve closure element 107 moves out of and into the opening 109 for increasing or decreasing the spacing between the valve closure element 107 and the annular flange or restriction 108 disposed within the conduit 22 so as to selectively allow more exhaust gas to pass from the exhaust manifold 12 to the intake system 11 as the EGR valve 106 is lifted in response to the solenoid 103 being turned on via the first control signal on lead 41 and the flow of EGR being lessened as the element 107 is lowered into the passage 109 to further restrict flow as the valve 106 is lowered or closed in response to the solenoid being turned off in response to the receipt of the second control signal via lead 42.

The exact nature of the solenoid 103 is not critical to an understanding of the present invention and it will be understood that the difference in the MAP and $MAP_O$ signals can be used to control either a "bang-bang" or a proportional type of feedback loop since the variation of EGR from nominal will be proportional to the deviation of actual MAP from the required $MAP_O$.

Furthermore, the solenoid 103 can be adjusted so as to remain on or off until the arrival of the next signal from the comparator 38 if the operation cycle of the feedback loop is sufficiently fast, or alternatively, it can be adjusted to provide a "one-shot" adjustment regardless of the magnitude of the difference between MAP and $MAP_O$ since the next comparator output will again incrementally adjust the position of the EGR valve 23 until the desired equality has been attained.

Figure 5:
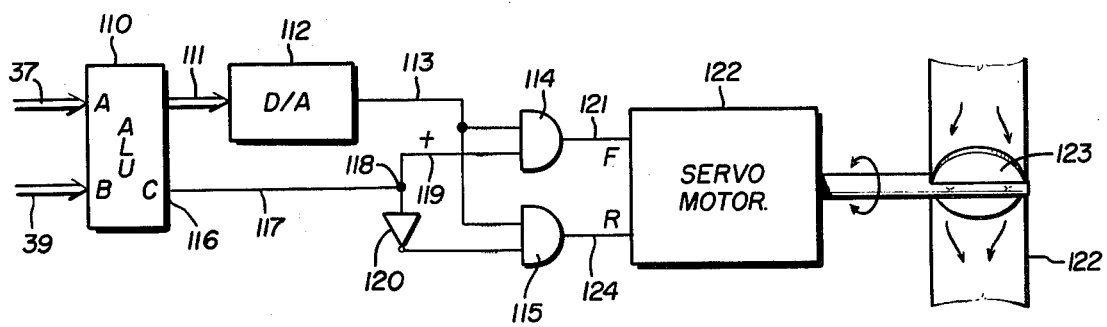
FIG. 5 is a block diagram of a modification of the comparator of FIG. 1 and an alternate embodiment of the blocks labeled actuator control, actuator, and EGR valve therein.

FIG. 5 represents an alternative to the comparator of block 38 of FIG. 1 and circuitry corresponding to the actuator controls of block 44, the actuator of block 45 and the EGR valve of block 23 of FIG. 1. In FIG. 5, the parallel input or data path 37 from the output 33 of the ROM 30 is connected to the first or "A" input of a conventional arithmatic logic unit (ALU) 110 and the compensated or uncompensated digital number representing the actual MAP is provided via data path 39 to the second or "B" input of the ALU 110. The ALU 110 will subtract the digital number presented at the A input from the digital number present at the "B" input and output a digital number representing the magnitude of the difference via data path 111. The difference will be supplied via path 111 to the input of a conventional D/A 112 whose output is coupled via lead 113 to the first input of a first AND gate 114 and to the first input of the second AND gate 115. The output of the D/A converter 112 will be a high signal whose duration will be proportional to the magnitude of the difference outputted from the ALU unit 110 as conventionally known.

The carry output 116 is connected via lead 117 to a node 118 and node 118 is connected via lead 119 to the second input of AND gate 114 and via inverter 120 to the second input of AND gate 115. The value of the signal present at the carry output 116 will indicate whether the value present at the "A" input is greater or less than the value present at the "B" input such that if $MAP < MAP_O$, a high signal will be outputted from the carry output and transmitted via lead 117, node 118 and lead 119 to enable AND gate 114. AND gate 114 will then generate an output pulse having a duration proportional to the magnitude of the difference between the two inputs to the ALU 110 and the output of AND gate 114 will be coupled via lead 121 to the forward drive input of a conventional servo motor 122 which will turn a butterfly-type EGR valve 123 disposed within conduit 22 so as to open the valve 123 an amount proportional to the duration of the signal outputted from AND gate 114 so as to increase the amount of exhaust gas fed back from the exhaust manifold 12 to the intake system 11.

Alternatively, if $MAP > MAP_O$, the signal at the carry output will be low and as this signal is transmitted via lead 117, node 119 and the inverter 120 to enable AND gate 115 so that its output will go high for a time duration proportional to the magnitude of the difference between the two inputs of ALU 110. This output signal from AND gate 115 is supplied via lead 124 to the reverse input of the servo motor 122 causing it to turn in the opposite direction an amount proportional to the duration of the pulse at the output of AND gate 115 and hence proportional to the difference between the signals present at the "A" and "B" inputs of the ALU 110 so as to close the EGR valve 123 a proportional amount to decrease the amount of exhaust gases supplied from the exhaust manifold 12 back to the intake system 11 as previously described.

Figure 6:
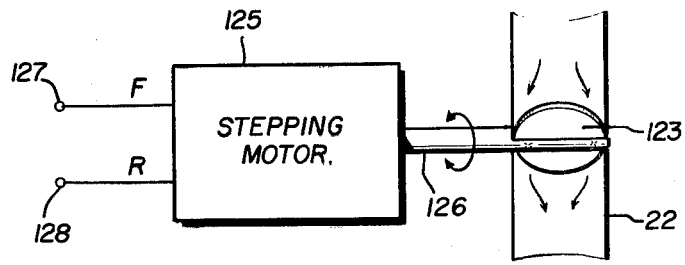
FIG. 6 is another means of implementing the actuator control, actuator and EGR valve functions represented by the correspondingly designated blocks of the closed loop control system of FIG. 1.

The illustration of FIG. 6 shows a stepping motor 125 adapted to incrementally rotate the shaft 126 in a forward or reverse direction in predetermined increments so as to open or close the butterfly-type EGR valve 123 to increase or decrease EGR, ad desired. The stepping motor may be of a conventional type wherein if the forward drive input 127 is connected to the lead 41 at the output of comparator 38 so as to receive a "high" signal whenever $MAP < MAP_O$, the stepping motor will rotate in a forward direction a pre-programmed increment to open the valve 123 a predetermined amount and increase EGR flow and if the reverse drive input 128 is connected to the output lead 42 of comparator 38 so as to receive a positive signal whenever $MAP > MAP_O$, then the stepping motor 125 will rotate the shaft 126 an incremental amount in the reverse direction thereby closing the EGR valve 123 a proportional amount and restricting or decreasing EGR flow.

Alternatively, the stepping motor 125 could be of a design which will rotate the shaft 126 a number of increments depending upon the duration of the input signal supplied to the forward and reverse inputs 127, 128. In this case, the forward input 127 would be connected to the output lead 121 from AND gate 114 and the reverse input 128 would be connected to the output lead 124 of AND gate 115 of FIG. 5.

The present invention also contemplates a closed loop method of EGR control in an internal combustion engine having a closed loop exhaust gas recirculation system in which the exhaust system and intake system of an internal combustion engine are connected to each other by a conduit so as to recirculate part of the exhaust gas from the exhaust system into the intake system for inhibiting the generation and emission of oxides of nitrogen and for regulating drivability and the like. The method of closed loop exhaust gas recirculation of the invention comprising steps of pre-programming a memory with a look-up table of optimal values of manifold absolute pressure as a function of engine speed and throttle position; addressing the look-up table of the memory with the actual values of engine speed and throttle angle measured as operating conditions of the engine; and then reading out the unique optimal value of manifold absolute pressure stored in the address memory location of the look-up table of the memory. The optimal value of absolute manifold pressure read out of the memory is then compared with the actual value of absolute manifold pressure measured as one of the operating conditions of the engine and the exhaust gas recirculation valve is operated in response to the result of the comparison for decreasing the quantity of exhaust gas fed back to the intake manifold whenever the comparison indicates that the actual absolute manifold pressure is greater than the pre-programed optimal absolute manifold pressure and for increasing the amount of exhaust gas fed back to said intake manifold whenever the actual absolute manifold pressure is less than the pre-programed optimal absolute manifold pressure.

Additionally, the method may include the additional step of compensating for variations in ambient barometric pressure and/or altitude, if desired. Furthermore, the step of compensation may include the additional steps of pre-programming the lookup table of a memory with values of compensation constants which are a function of throttle angle values and ambient barometric pressure or altitude; addressing the look-up table of the memory with the actual measured value of ambient barometric pressure or altitude and the throttle angle; reading out of the memory the unique compensation constant defined by the values used to address the memory; multiplying the throttle angle by the pressure compensation constant read out of the look-up table of the memory to produce a product which is a compensated value of throttle angle; and then utilizing the compensated value of throttle angle in said table.

Having described the preferred embodiment of the method and apparatus of the closed loop EGR control system of the present invention, it will be understood that the specific examples given are employed in a descriptive sence only and not for the purpose of limitation. Other embodiments, circuit implementations, and variations and modifications thereof and alternatives thereto will be obvious to those skilled in the art and may be made without departing from the spirit and scope of my invention which is limited only by the appended claims.

I claim:

1. In an internal combustion engine having an intake system, an exhaust system, a throttle for controlling the air flow into said intake system, and an output shaft rotatably driven by the combustion of fuel and air in said engine, a closed loop exhaust gas recirculation system comprising:

a memory means for storing a look-up table of optimal values of absolute manifold pressure ($MAP_O$) as a function of engine speed and throttle position a unique one of said stored optimal values of absolute manifold pressure being defined for each memory location and each memory location being accessible by the entry of a first dimension address and a second dimension address for outputting the optimal value of absolute manifold pressure stored therein;

means associated with said engine and responsive to the rotation of said output shaft for generating a first digital number indicative of actual engine speed for addressing one of said first and second address dimensions of said memory means;

means associated with said throttle and responsive to the relative position thereof for generating a second digital number indicative of the actual throttle position for addressing the other of said first and second address dimensions of said memory means;

said memory means being responsive to the generation of said first and second digital numbers for addressing said first and second memory dimensions to access said unique memory location defined thereby and output a third digital number indicative of said unique optimal value of absolute manifold pressure $MAP_O$ stored therein;

means coupled to said intake system and responsive to the actual absolute manifold pressure existing therein for generating a fourth digital number indicative of the actual absolute manifold pressure (MAP);

means for comparing said third and fourth digital numbers and generating a first control signal if $MAP < MAP_O$ and for generating a second control signal if $MAP > MAP_O$;

a conduit operatively coupling said exhaust supply to said intake supply for supplying said exhaust gases to said intake system for inhibiting the generation and emission of oxides of nitrogen while regulating drivability and the like;

valve means disposed at least partially within said conduit for regulating the flow of exhaust gases back to said intake system; and control means for regulating the opening and closing of said valve means and responsive to said first control signal for increasing the amount of recirculated exhaust gases supplied to said intake system and responsive to said second control signal for decreasing the amount of recirculated exhaust gases supplied to said intake system.

2. The closed loop exhaust gas recirculation system of claim 1 further comprising:

means for modifying said second digital number prior to its input into said comparing means to compensate for variations in ambient pressure.

3. The closed loop exhaust gas recirculation system of claim 2 wherein said modification means comprises:

a second memory means for storing a look-up table of compensation constants (K) as a function of ambient pressure and throttle angle, a unique one of said stored values of compensation constant being defined for each memory location and each memory location being accessible by the entry of a first dimension address and a second dimension address for outputting the value of the compensation constant K stored therein;

means for sensing ambient pressure and for generating a fifth digital number indicative thereof for addressing one of said first and second dimension addresses of said second memory means;

means coupling said second memory means to said means for generating a fourth digital number for addressing the other of said first and second dimension addresses of said second memory means;

said second memory means being responsive to the generation of said fourth and fifth digital numbers for addressing said first and second dimension addresses of said second memory means to access the unique memory location defined thereby and output a sixth digital number indicative of the compensation constant K stored therein;

means coupled to the output of said second memory means and to said means for generating said fourth digital number for multiplying said fourth and sixth digital numbers to output a modified fourth digital number indicative of a compensated value of throttle angle prior to inputting said modified fourth digital number into said comparing means.

4. In an internal combustion engine having an intake system, an exhaust system, means for regulating the air flow into said intake system, and an output shaft rotatably driven by the combustion of fuel and air in said engine, a closed loop exhaust gas recirculation system comprising:

a memory means for storing a look-up table of optimal values of absolute manifold pressure ($MAP_O$) as a function of engine speed and air flow, a unique one of said stored optimal values of absolute manifold pressure being defined for each memory location and each memory location being accessible by the entry of a first dimension address and a second dimension address;

means associated with said engine and responsive to the positional rotation of said output shaft for generating a first digital number indicative of the actual engine speed for addressing one of said first and second dimension addresses of said memory means;

means associated with said intake means and responsive to the air flow therein for generating a second digital number indicative of the actual air flow therein for addressing the other of said first and second dimension addresses of said memory means;

said memory means being responsive to the generation of said first and second digital numbers for addressing said first and second dimension addresses to access said unique memory location defined thereby and output from said memory means a third digital number indicative of the unique optimal value of absolute manifold pressure ($MAP_O$) stored therein;

means coupled to said intake system and responsive to the actual absolute manifold pressure (MAP) existing therein for generating a fourth digital number indicative of the actual absolute manifold pressure;

means for comparing said third and fourth digital numbers and generating a first control signal if $MAP < MAP_O$ and for generating a second control signal if $MAP > MAP_O$;

a conduit operatively coupling said exhaust supply to said intake supply for supplying said exhaust gases to said intake system for inhibiting the generation and emission of oxides of nitrogen while regulating drivability and the like;

valve means disposed at least partially in said conduit for regulating the flow of exhaust gases from said exhaust system back to said intake system; and control means for regulating the operation of said valve means and responsive to said first control signal for increasing the amount of recirculated exhaust gases supplied to said intake system and responsive to said second control signal for decreasing the amount of recirculated exhaust gases supplied to said intake system.

5. The closed loop exhaust gas recirculation system of claim 4 further comprising:

means for modifying said second digital number prior to its input into said comparing means to compensate for variations in ambient pressure.

6. The closed loop exhaust gas recirculation system of claim 5 wherein said modification means comprises:

a second memory means for storing a look-up table of compensation constants (K) as a function of ambient pressure and air flow, a unique one of said stored values of compensation constant being defined for each memory location and each memory location being accessible by the entry of a first dimension address and a second dimension address for outputting the value of the compensation constant K stored therein;

means for sensing ambient pressure and for generating a fifth digital number indicative thereof for addressing one of said first and second dimension addresses of said second memory means;

means coupling said second memory means to said means for generating said fourth digital number for addressing the other of said first and second dimension addresses of said second memory means;

said second memory means being responsive to the generation of said fourth and fifth digital numbers for addressing said first and second dimension addresses of said second memory means to access the unique memory location defined thereby and output a sixth digital number indicative of the compensation constant K stored therein;

means coupled to the output of said second memory means and to said means for generating said second digital number for multiplying said second and sixth digital numbers to output a modified second digital number indicative of a compensated value of air flow prior to inputting said modified second digital number into said comparing means.

7. A closed loop exhaust gas recirculation control system in which the exhaust system and intake system of an internal combustion engine are connected to each other by a conduit so as to recirculate part of the exhaust gas from the exhaust system into the intake system for inhibiting the generation and emission of oxides of nitrogen and for regulating drivability and the like, said closed loop exhaust gas recirculation control system comprising:

a read only memory pre-programmed for storing a look-up table of optimal values of absolute manifold pressure ($MAP_O$) as a function of engine speed and throttle angle, a unique one of said stored optimal values of absolute manifold pressure being defined for each memory location being accessible by addressing first and second memory dimensions;

means associated with said engine for sensing the speed of operation thereof and for generating a first digital number indicative of the engine speed for addressing one of said first and second memory dimensions;

the intake system of said internal combustion engine including means for regulating the air flow therethrough, said air flow regulating means including a throttle and means responsive to the relative position of said throttle for generating a second digital number indicative of the actual throttle position for addressing the other of said first and second memory dimensions;

said memory means being responsive to the generation of said first and second digital numbers for addressing said first and second memory dimensions to access said unique memory location defined thereby to output a third digital number indicative of the unique optimal value of absolute manifold pressure ($MAP_O$) stored therein;

means coupled to said intake system and responsive to the actual absolute manifold pressure existing therein for generating a fourth digital number indicative of said actual absolute manifold pressure MAP;

means for sensing the actual altitude/barometric pressure and for compensating one of said first and second digital numbers therefor;

means for comparing said compensated one of said third and fourth digital numbers with the other of said third and fourth digital numbers for generating a first compensated control signal when $MAP < MAP_O$ and for generating a second compensated control signal when $MAP > MAP_O$;

valve means disposed at least partially in said conduit for regulating the flow of exhaust gases from said exhaust system to said intake system; and means for operatively controlling said valve means and responsive to said first compensated control signal for increasing the amount of recirculated exhaust gases supplied to said intake system and responsive to said second compensated control signal for decreasing the amount of recirculated exhaust gases supplied to said intake system.

8. The closed loop exhaust gas recirculation system of claim 7 wherein said compensating means comprises:
a second read only memory programmed for storing a look-up table of predetermined compensation constants (K) as a function of ambient barometric pressure/altitude and throttle angle, a unique one of said predetermined compensation constants being stored in each memory location and each memory location being uniquely addressible by addressing first and second dimensions of said second read only memory;

means for sensing ambient barometric pressure/altitude and for generating a fifth digital number indicative thereof for addressing one of said first and second memory dimensions of said second read only memory;

means coupled to the output of said means for generating said fourth digital number for addressing the other of said first and second memory dimensions of said second read only memory, said second read only memory being responsive to the addressing of said first and second dimensions thereof for outputting a sixth digital number indicative of the value of said compensation constant K stored in the addressed memory location;

multiplier means having one input coupled to the output of said second read only memory means for receiving said sixth digital number therefrom and the other input coupled for receiving the one of said third and fourth digital numbers to be compensated for multiplying said one of said third and fourth digital numbers to be compensated by said sixth digital number for outputting said one of said third and fourth digital numbers which is compensated for ambient barometric pressure/altitude prior to supplying said compensated digital number to said comparing means.

9. In an internal combustion engine having an intake system including throttle means for regulating the flow of air therethrough, an exhaust manifold, a conduit connecting the exhaust manifold to the intake manifold so as to recirculate a part of the exhaust gas from said exhaust system into the intake system, a closed loop method of controlling exhaust gas recirculation comprising the steps of:

pre-programming a memory with a look-up table of optimal values of absolute manifold pressure as a function of engine speed and throttle position;

addressing the look-up table of the memory with the actual values of engine speed and throttle angle measured as operating conditions of the engine;

reading out the unique optimal value of absolute manifold pressure stored in the addressed memory location of the look-up table of the memory;

comparing the optimal value of absolute manifold pressure read out of the memory with the actual value of absolute manifold pressure measured as one of the operating conditions of the engine; and operating the exhaust gas recirculation valve for increasing the quantity of exhaust gas fed back to the intake manifold whenever the comparison indicates that the actual absolute manifold pressure is less than the pre-programmed optimal absolute manifold pressure and for decreasing the amount of exhaust gas fed back to said intake manifold whenever the actual absolute manifold pressure is greater than the pre-programmed optimal absolute manifold pressure.

10. The closed loop method of exhaust gas recirculation of claim 9 including the additional steps of sensing the ambient barometric pressure or altitude and compensating one of the throttle angle and the air flow value prior to said comparison step.

11. The closed loop method of exhaust gas recirculation of claim 10 wherein said compensating step includes the steps of pre-programming the look-up table of a second memory with values of compensation constants which are a function of throttle angle and ambient barometric pressure or altitude, addressing the look-up table of the memory with the actual measured value of ambient barometric pressure or altitude and the throttle angle, reading out of the memory the unique compensation constant defined by the values used to address the memory, multiplying the throttle angle by the compensation constant read out of the look-up table of the memory to produce a product which is a compensated value of throttle angle, and then utilizing the compensated value of throttle angle in said comparison step.

* * * * *